July 2, 1935.  J. V. CAPUTO  2,006,912
ELECTRIC WELDING
Filed March 3, 1933   4 Sheets-Sheet 3
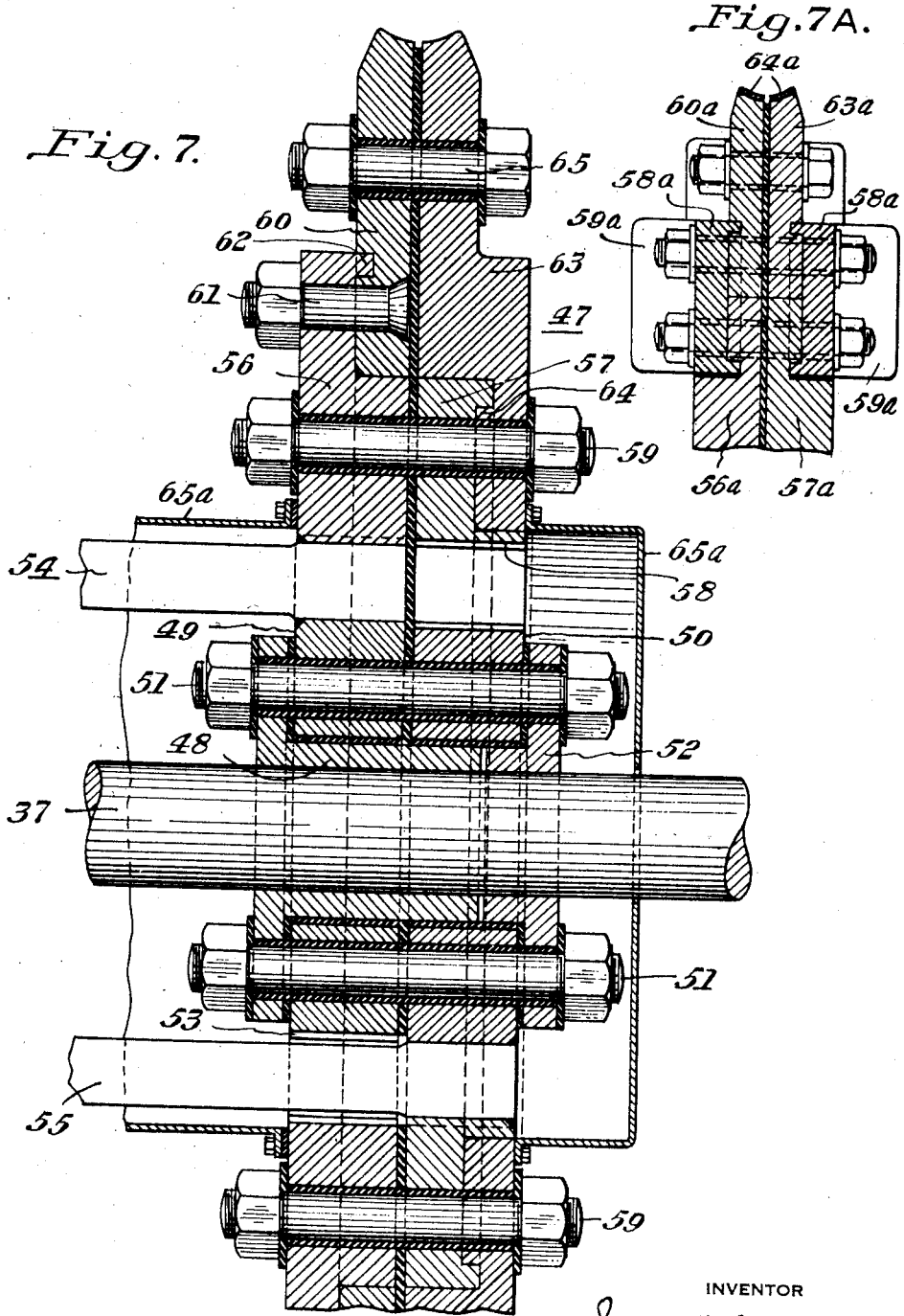

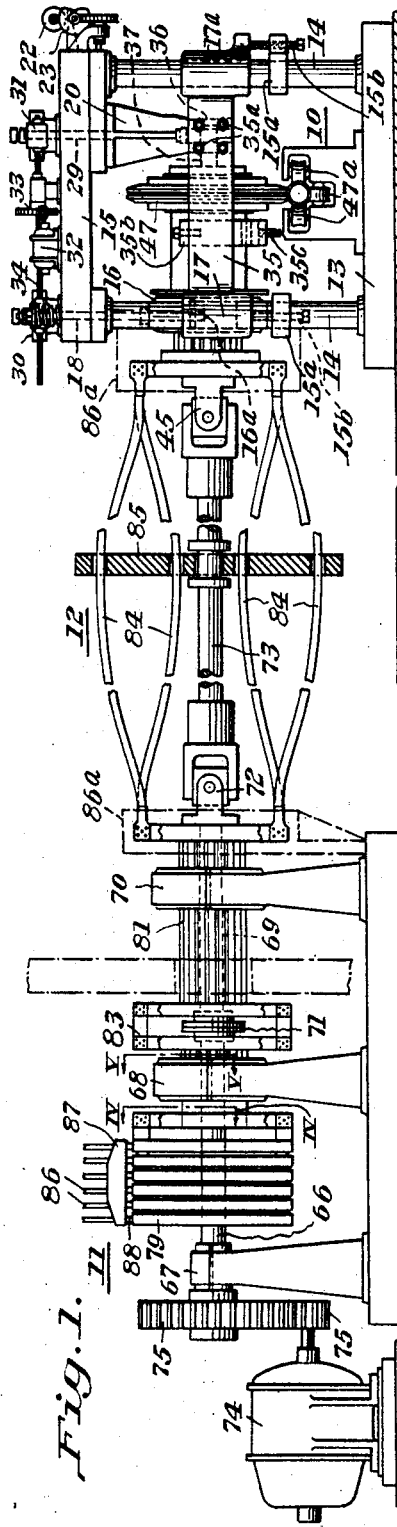

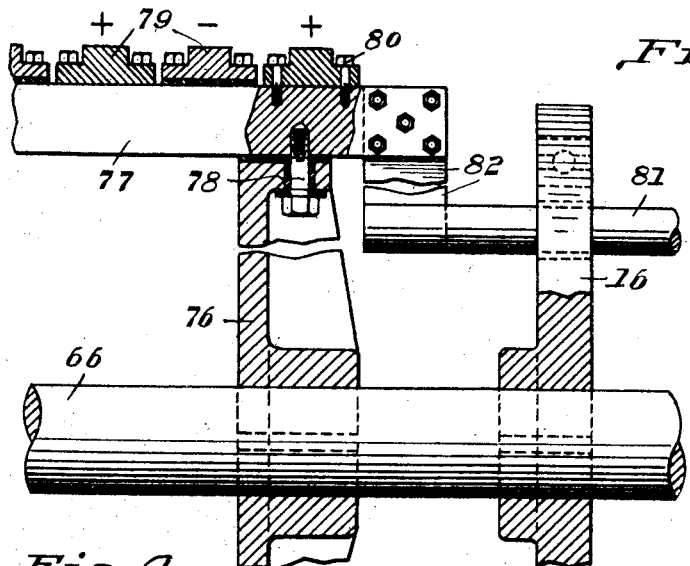
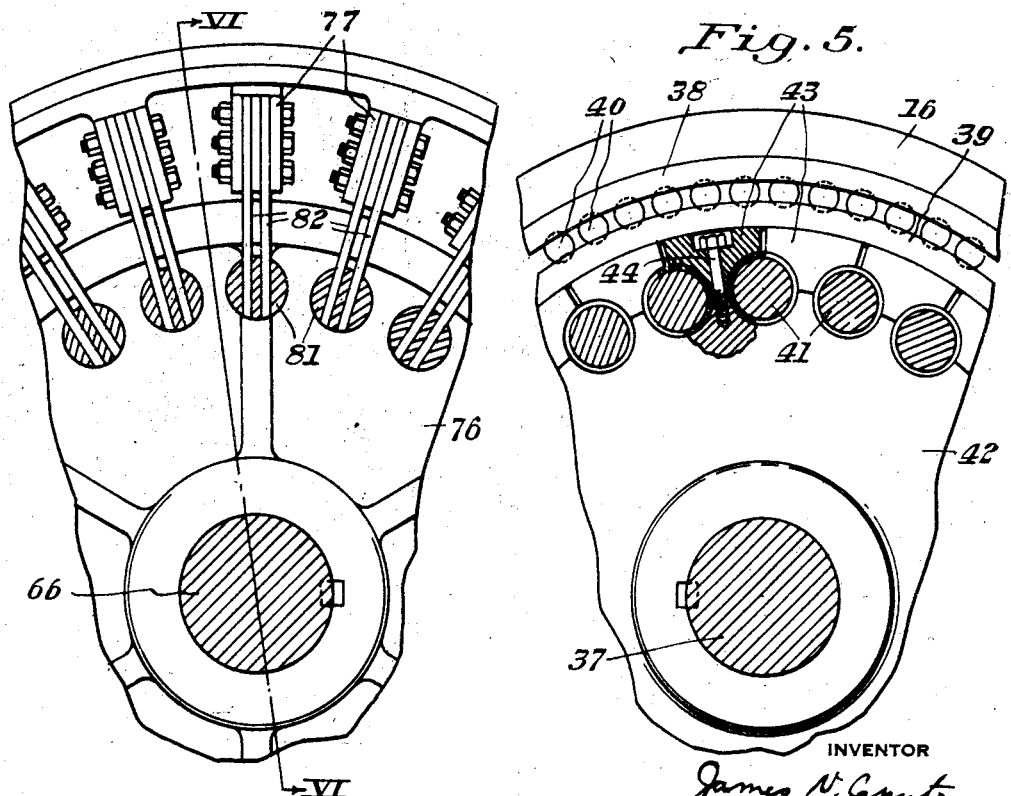

July 2, 1935.　　　　J. V. CAPUTO　　　　2,006,912
ELECTRIC WELDING
Filed March 3, 1933　　　　4 Sheets-Sheet 4
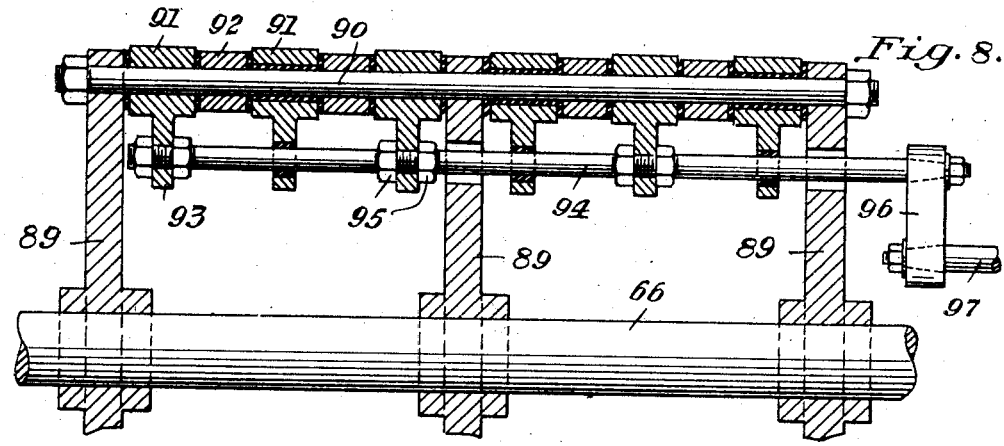
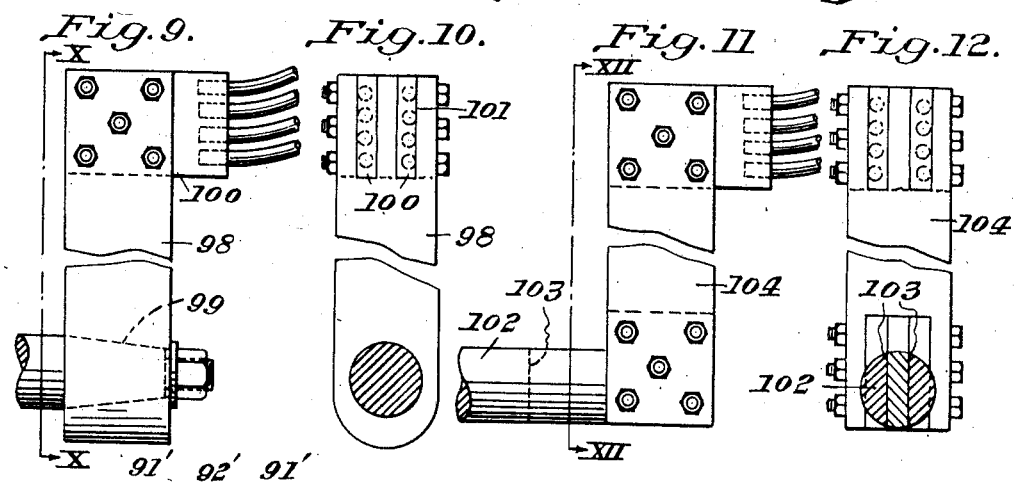
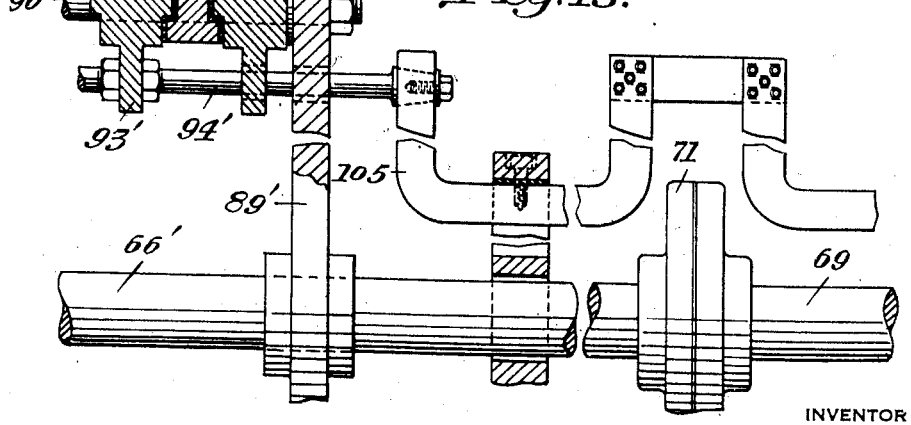
INVENTOR
James V. Caputo
by his attorneys
Byrnes, Stebbins, Parmelee & Blenko Patented July 2, 1935

2,006,912

UNITED STATES PATENT OFFICE 2,006,912

ELECTRIC WELDING

James V. Caputo, Crafton, Pa.

Application March 3, 1933, Serial No. 659,532

29 Claims. (Cl. 219—4)

My invention relates to electric welding and, in particular, to the continuous welding of metal lengths, such as pipe, by the resistance method.

Numerous methods and many forms of apparatus have been proposed heretofore for welding pipe but, so far as I am aware, substantial objections to all such methods and apparatus have been encountered in actual practice. Certain methods and apparatus have been successful in the manufacture of thin gauge tubes having an axial seam connected at intervals by discontinuous welds. It has been attempted to modify such method and apparatus for the manufacture of heavy wall pipe having a continuous fluid-tight weld.

The welding of heavy wall pipe requires currents of such magnitude that the transmission thereof to the point of weld becomes a major problem. In some types of welders, alternating current is supplied to a rotary electrode from transformers positioned thereabove or therebelow. The location of the transformers adjacent the electrode considerably obstructs the working space and is especially disadvantageous in the case of adjusting or repairing the electrode structure. In another type of welder, the transformers rotate with the electrode but are positioned closely adjacent thereto so that the same objection of inaccessibility is present.

An objection to all alternating current systems of electric welding is that the speed of travel of the material must not exceed a given rate for a given frequency of the alternating current, if a continuous weld is to be formed.

I have overcome these objections to the devices of the prior art by providing means for transmitting electric currents of the desired magnitude from a convenient point of generation to a rotating electrode which is sufficiently distant from the generating source as to be fully accessible at all times and to facilitate the manufacture of welded pipe. The invention makes it possible to handle the necessary welding currents so efficiently as to permit the use of direct current for continuously welding heavy wall pipe, which has not been possible heretofore, all apparatus for the manufacture of heavy wall pipe with which I am familiar being designed for alternating current. While the invention is particularly desirable in conjunction with welding apparatus, it is also useful in other applications where it is desired to deliver a large block of electric energy at low voltage, either direct current or alternating current, to a rotating member. While the invention permits the use of direct current for welding heavy wall pipe for the first time in the art, it is also highly useful in welding systems utilizing alternating current.

By using direct current, and providing means whereby any desired magnitude of current may be supplied to the point of weld, I am able to weld heavy wall pipe continuously at speeds which would not be possible with alternating current welding.

In accordance with my invention, I employ a welding electrode substantially in accordance with the disclosure of my co-pending application Serial No. 549,441, filed July 8, 1931, for Welding electrode. I mount this electrode on a shaft which is vertically adjustable in a suitable supporting frame. Means for supplying electric current to the electrode extend from the current source, which may be located at any convenient point. The exact nature of the connecting means will become apparent as the description of the invention proceeds. The connections are rotatable with the electrode and a suitable drive therefor is provided.

For a complete understanding of the invention, reference is made to the accompanying drawings illustrating a present preferred embodiment of the invention and certain modifications thereof. In the drawings:

Figure 1 is a side elevation, largely diagrammatic, of a preferred form of the apparatus;

Figure 2 is an enlarged view of a portion of Figure 1;

Figure 3 is a sectional view along the line III—III of Figure 2;

Figure 4 is a partial sectional view along the line IV—IV of Figure 1;

Figure 5 is a similar view along the line V—V of Figure 1;

Figure 6 is a partial sectional view taken along the line VI—VI of Figure 4;

Figure 7 is a transverse axial sectional view of the welding electrode itself;

Figure 7A is a partial sectional view similar to Figure 7 illustrating a modified form of electrode;

Figure 8 is a view similar to Figure 6 showing a modification;

Figure 9 is a side elevation of a detail;

Figure 10 is an end view thereof along the line X—X of Figure 9 with parts in section;

Figures 11 and 12 are views similar to Figures 9 and 10 showing a modification; and Figure 13 is a view similar to Figures 6 and 8 showing a further modification.

Referring in detail to the drawings, the invention comprises a welder 10 located adjacent the current supply apparatus indicated generally at 11, and connections 12 extending from said apparatus to the welder.

The welder 10 comprises a base 13 having columns 14 at the corners thereof which support a head piece 15. A bearing carriage 16 having guide sleeves 17 surrounding two of the columns 14 is vertically slidable thereon. The bearing carriage is preferably spring supported on hangers 16a from the head casting, as shown in my co-pending application Serial No. 475,174. An adjusting screw 18 is provided for vertically shifting the carriage. Collars 15a on the columns 14 have screws 15b for temporarily supporting the sleeves 17.

Guides 19 are secured to the lower surface of the head piece 15 by bolts 19a on the side opposite the bearing carriage 16. A bearing bracket 20 is slidably supported on the guides 19. Actuating screws 21 extend through tapped holes in the bracket for shifting the latter along the guides 19. A motor 22 and speed reducing gearing 23 are provided for driving the screws 21. Bolts 24 are provided for clamping the bracket 20 in adjusted position on the head piece 15.

A bearing 25 is carried on a cross bar 26 which is movable vertically within bifurcated lower ends 27 of the bracket 20. The cross bar 26 is normally sustained by spring supports 28. An adjusting screw 29 engages the bearing for effecting vertical adjustment. The vertical adjusting screws 18 and 29 are driven through worm and worm wheel reducing gears 30 and 31 by a motor 32 through spur gearing 33 and a shaft 34. The worm of the drive 31 (not shown) has slidable engagement with the end of the shaft 34 which has a square or other non-circular section. The screws 18 and 29 traverse nuts positioned in the bores of the worm wheels of the drives 30 and 31 in the usual manner.

Braces 35 extend across the welder on the outside thereof connecting the bearing carriage 16 and the cross bar 26. The braces are integral with the sleeves 17 at one side of the welder and with similar sleeves 17a at the other side. The cross bar 26 is secured at each end by bolts 35a to the braces 35 with spacers 36 therebetween.

A shaft 37 is journaled in the bearing 25 and the carriage 16. The structure of the latter may be more fully understood by reference to Figure 5. The bearing 25 is of ordinary construction and requires no detailed explanation. The bearing carriage 16 has an outer raceway 38 which rotatably supports an inner raceway 39 on a plurality of bars or rollers 40. The inner raceway 39 is simply a ring which serves to clamp a plurality of electrically conducting bars 41 into suitably shaped seats formed on the periphery of a disc 42 which is keyed to the shaft 37. The bars are suitably insulated from the disc and are held in place by clamping brackets 43 and screws 44 in addition to the ring or raceway 39. The end of the shaft 37 projects from the welder and is provided with a coupling yoke 45 for a purpose to be described later.

An electrode 47 is mounted on the shaft 37. Work-engaging pressure rolls 47a cooperate with the electrode 47. The details of the electrode are illustrated in Figure 7. A flanged sleeve 48 is keyed to the shaft 37. Conducting rings 49 and 50 surround the sleeve 48 and are insulated from each other and from the sleeve. Clamping bolts 51 and a disc 52, both of which are insulated from the conducting rings, bind the latter tightly to the sleeve 48. The peripheries of the rings 49 and 50 are notched as at 53.

Conducting bars 54 and 55 are welded or brazed alternately to the rings 49 and 50. The bars 54 are welded to the ring 49 between adjacent notches on the periphery thereof. The bars 55 extend between the notched portions of the ring 49 and are welded to the portions of the periphery of the ring 50 between notches. The bars 54 and 55 are preferably of rectangular section, extend laterally of the electrode 47, and are connected to the bars 41 (Figure 5) by any convenient means, such as by slotting and brazing or bolting. Alternatively, the bars 41 may be rectangular in section and integral with the bars 54 and 55.

Conducting rings 56 and 57 embrace the assembled bars 54 and 55, having their inner peripheries notched at 58 for engaging or clearing the bars, respectively. Bolts 59 secure the rings 56 and 57 together. An electrode disc 60 is secured to the ring 56 by bolts 61 having conical heads seated in countersunk holes in the disc. The ring 56 has a flange 62 for entering a similarly shaped groove in the disc 60. A similar disc 63 is secured to the ring 57 by the bolts 59 and has a groove 64 for receiving a flange on the ring. Bolts 65 secure the discs 60 and 63 together adjacent their peripheries. The contact between rings on the same side of the central dividing plane of the electrode may be improved by the insertion therebetween of resilient washers of corrugated sheet metal or wire mesh, or of a layer of a conducting paste or amalgam. Shields 65a which are preferably grounded, protect the central portion of the electrode from the dirt, grit, heat and moisture usually associated with a welding operation.

A shaft 66 is journaled in bearings 67 and 68. The bearing 67 is a simple pedestal bearing while the bearings 68 are similar to the bearing carriage 16 already described, and provide not only a rotatable support for the shaft but also electrical connections extending therealong and fixed relative thereto. A shaft 69 is supported in a bearing 70 similar to the bearing 68 and is coupled to the shaft 66 at 71. The shaft 69 has a yoke 72 thereon. The yokes 45 and 72 of the shafts 37 and 69 form parts of universal couplings at the ends of a connecting shaft 73. The shaft 66 is driven by a motor 74 through gearing 75.

Referring now particularly to Figures 4 and 6, spiders 76 are keyed to the shaft 66. Conducting bars 77 extending in parallel to the axis of the shaft 66 are secured to the spiders 76 by screws 78 but are insulated therefrom. Slip rings 79 embrace the bars 77 on the spiders 76. Each slip ring engages alternate bars and is notched out and insulated from the other bars. Screws 80 secure the rings to the bars.

Conducting bars 81 extending through the bearing 68 and corresponding to the bars 41 of Figure 5, are connected to the bars 77 by risers 82. The risers 82 are bolted to the bars 77 and brazed in the slotted ends of the bars 81 as shown in Figure 4.

The bearing 70 and the conducting bars 82 associated therewith are identical with the structure just described except for the length of the bars. The coupling 71 between the shafts 66 and 69 is bridged by connections 83 consisting of risers similar to those shown at 82 and strap connections bolted to the risers. A similar construction at the ends of the bars 82 is provided for connecting the bars to conductors 84, the other ends of which are secured to similar risers extending outwardly from the bars 41. An insulating disc 85 maintains the conductors 84 properly separated. Shields 86ª enclose the risers connected to the conductors 84 and the projecting ends of the bars 41 and 82. A cylindrical shield may also be provided to enclose the cables 84 for receiving an air blast to cool the latter.

Electric current for welding may be supplied to the electrode through the connections just described from any convenient source. I prefer to employ a direct current generator having its leads indicated at 86 extending to a brush holder 87 provided with brushes 88 bearing on the slip rings 79. Instead of a direct current generator, however, I may employ stationary transformers if it is desired to use alternating current. I may also employ rotating transformers, in which case the slip rings 79 and the bars 77 may be dispensed with. The transformers are mounted on the shaft 66 as disclosed in my co-pending applications Serial Nos. 453,185 and 475,174, and the transformer secondaries are connected directly to the risers 82. The high voltage current for the transformer primaries is supplied in the usual manner through other slip rings.

An important feature of the invention is that in all portions of the welding circuit, adjacent conductors are of opposite instantaneous polarity if alternating current is used. This arrangement reduces reactance drop and resistance losses. The arrangement of conductors so that the magnetic fields thereof are largely neutralized limits the reactance drop and prevents the alternating current resistance of the circuit from being greatly in excess of the direct current resistance. The total welding current is supplied into a plurality of parallel circuits and the circuit extending to the load is interleaved with that returning therefrom. The structure described also permits large direct currents to be supplied to the welding electrode without excessive loss. The size and strength of the various elements is such that the circuit can be designed to have a very low resistance and a correspondingly high transmission efficiency. A positive drive is provided for the electrode, as well as for the rotating current supply connections and synchronous rotation is always assured. The conducting members are properly supported at all points to withstand the forces resulting from the counteraction of their electromagnetic fields.

The construction of the welder and the electrode permit the removal of the latter from its supporting shaft on one side thereof only. I find that this construction is superior to the former type in which the electrode is supported by fixed bearings on opposite sides thereof. It will be apparent that the right-hand bearing for the electrode shaft is retractible very readily so that the rings comprising the electrode 47 may be removed over the free end of the shaft. The rings may thus be made continuous with a consequent reduction in the amount of machining necessary.

When it is desired to renew, remove or repair the outer electrode rings 60 and 63, or to have access to the electrode for any other reason, the right-hand bearing of the shaft 37 may be retracted by the means which has been described in detail. The bolts 24 and 35ª and the spacers 36 are first removed. The motor 32 is then operated to withdraw the screws 18 and 29. Hold down screws 28ª prevent the cross bar 26 from rising more than a predetermined distance due to the extension of the springs 28. A yoke 35ᵇ is suspended between the braces 35, is adjustable longitudinally thereon, and is provided with a shoe adjustably supported by screws 35ᶜ which affords a temporary support for the shaft 37 and the electrode 47 when the bearing 25 is removed. Operation of the motor 22 drives the screws 21 to withdraw the bearing bracket 20 and with it, the bearing 25 and the cross bar 26. The right-hand end of the shaft 37 is thus free for removal of the electrode rings or any other adjustments or repairs which may be necessary.

It will be obvious that the location of the electrical generating and transmitting equipment apart from the welder proper where it can be easily supervised and maintained, is a tremendous advantage over the apparatus of the prior art in which the electrical equipment is all exposed to the dirt, grit, heat and moisture which is inevitably present around the welder. The avoidance of obstruction at the welder has already been mentioned. It will be clear that this gives the operator a much better opportunity to properly supervise the work than is provided by apparatus which is so closely hedged about with electrical equipment as to make proper supervision an impossibility. It will be noted that current is supplied to the electrode from one side only and that the portions of the electrode are removable from the side opposite that to which the power is supplied.

Figure 7A shows a modified form of electrode which is somewhat similar to that shown in Figure 7. The modified form comprises a pair of discs 56a and 57a having peripheral rings 60a and 63a therearound. Bridging rings 58a overlap both the discs and the rings and have radiating fins 59a thereon. The various members are bolted together as shown. The rings 58a provide good contact between the discs and the electrode rings and also provide additional heat radiating surface. The electrode rings are provided with a wearing surface 64a of a wear-resistant, highly conducting alloy.

Figure 8 illustrates a modified form of slip ring construction in which the shaft 66 is provided with spiders 89. Rods 90 extending through the spiders support rings 91 strung thereon separated by spacers 92. Alternate rings 91 are insulated from the rods 90 and remaining rings have electrical engagement therewith. Lugs 93 depending from the rings 91 are traversed by rods 94 which may contact with alternate rings by means of clamping nuts 95 and are insulated from the remaining rings. The ends of the rods 94 have a tapered fit with risers 96 and bars 97 for similar engagement with the risers.

Figure 10 illustrates a modified form of riser 98 for connecting the bars 82 to the conductors 84. Bars 99 have a tapered fit with the inner ends of the risers 98 and the outer ends thereof have blocks 100 bolted thereto with recesses 101 for receiving cables having their ends brazed therein.

Figures 11 and 12 illustrate a further modification which is similar except that the bars indicated at 102 have slotted terminals 103 welded thereto for cooperation with the slotted inner end of the riser indicated at 104.

Figure 13 illustrates a further modified form of slip ring and connecting bar construction. In Figure 13, the arrangement of spiders, slip rings, spacers, supporting and conducting rods, is similar to that of Figure 8 with slight differences in detail which will be obvious on inspection. Corresponding parts are indicated by the same numerals as in Figure 8 with a prime affixed. The connections extending from the rods 94', however, are bent strap, as shown at 105, instead of jointed bar.

Although I have illustrated and described herein but one preferred embodiment of the invention, together with certain minor modifications thereof, it will be apparent that many changes in the apparatus disclosed may be made without departing from the spirit of the invention or the scope of the appended claims.

I claim:

1. In a welder, base, columns thereon, a head piece on the columns, a bearing carriage slidable on two of the columns, a bearing bracket laterally movable on the head casting, a shaft journaled in said carriage and bracket, an electrode on the shaft, and conductors extending through said carriage to the electrode.

2. In a welder, base, columns thereon, a head piece on the columns, a bearing carriage slidable on two of the columns, a bearing bracket laterally movable on the head casting, a shaft journaled in said carriage and bracket, an electrode on the shaft, braces extending between columns parallel to said shaft, and means connecting a portion of the bracket to the braces.

3. In a welder, a bearing support, a shaft extending therethrough, a disc on the shaft, conductors traversing the disc parallel to the shaft but insulated from the disc and extending on both sides of the support, a ring surrounding the disc, and anti-friction means between said ring and support for rotatably supporting the shaft and conductors.

4. In a welder, a frame, a depending bearing bracket slidable laterally of the frame, a cross bar slidable vertically in said bracket, independent means for actuating said bracket and bar, and means for securing the bracket and bar rigidly to said frame when moved to the desired position.

5. In a welder, a shaft, slip rings mounted thereon, a second shaft spaced from the first but co-axial therewith, a welding electrode on said second shaft, electric conductors disposed about the shaft and extending directly from said rings to said electrode, and means connecting said shafts for rotation as a unit.

6. In a welder, the combination with an electrode on a shaft rotatably supported in a frame, a source of current at a distance from the electrode laterally thereof, conductors extending from the source into direct engagement with the electrode, a drive for the shaft including a co-axial shaft coupled thereto and means thereon supporting said conductors in spaced relation.

7. In an apparatus for continuously, electrically welding a seam between metallic edges, a welding electrode adapted to engage said edges, means for causing the seam to travel longitudinally while engaged by said electrode, and means for delivering to said electrode a current of electricity for heating the edges to be welded, said means including conductors extending axially of, in conducting engagement and rotatable with the electrode, and flexible joints between portions of said conductors.

8. In a welder, a shaft, an electrode mounted thereon, bearings on both sides of said electrode for supporting the shaft, and current supply means for said electrode including electrically conducting members engaging the electrode and extending through one of said bearings.

9. In a welder, a frame, a bearing carriage slidable on said frame, a shaft bearing on said carriage including axial electric conductors insulated from each other and the bearing, and a second shaft bearing adjustable axially and cooperating with the first-mentioned bearing to support an electrode shaft.

10. In a welding apparatus, a shaft, an electrode mounted thereon, conductors extending from the electrode along the shaft, a second shaft substantially aligned with the first and connected thereto, slip rings mounted on said second shaft, means connecting said rings to a low-voltage source of high-amperage welding current, and a drive for at least one of said shafts.

11. Apparatus for driving and supplying heavy currents to a rotary shaft-mounted electric consumption device comprising a drive shaft coaxial with the shaft of the device and coupled thereto, means for actuating the drive shaft, electric conductors extending along the drive shaft in spaced relation, slip rings on said drive shaft connected to said conductors, and rotating bearings between said rings and said device for supporting said conductors, said bearings including a stationary ring, and a disc rotatable therein, said conductors traversing the disc.

12. Apparatus for electric heating which includes a rotatable electrode, bearings supporting the electrode, means for progressively advancing the work to be heated in contact therewith, current transmitting conductors extending axially of and connected to the electrode, said conductors being rotatable with said electrode, and bearings rotatably supporting said conductors at points spaced from the electrode.

13. In a rotatable electric power connection, a movable, rotatable consuming device adapted to draw current from a set of rings, relatively fixed but rotatable therewith, a shaft connecting the device to said rings, said shaft having universal joints therein, and electrical connections including flexible members extending along said shaft and terminating on said device and said rings.

14. In a rotatable electric power connection, a movable, rotatable consuming device, and a relatively fixed, rotatable current-delivery means, a shaft connecting the device to said means, and electrical connections extending along said shafts and into electric-conducting engagement with said device, portions of said shaft and connections having flexible joints therebetween permitting an angular relation of said portions.

15. Apparatus for supplying welding current to a shaft-mounted electrode, comprising a plurality of conductors extending axially of the electrode to a current-delivery means adjacent thereto, and a rotatable bearing between the electrode and the means including a stationary sleeve and a disc rotatable therein supporting the conductors.

16. In an apparatus for continuously, electrically welding a seam between metallic edges, a welding electrode including twin discs for engaging said edges, means for causing the seam to travel longitudinally while engaged by said electrode, and means for delivering to said electrode a current of electricity for heating the edges to be welded, said means including conductors extending laterally of the electrode and in conducting engagement therewith, said conductors being connected alternately to said discs, respectively, and being of opposite polarity so as to minimize the reactance of the circuit including said supply means, the conductors and the electrode.

17. Welding apparatus comprising a twin-disc electrode mounted for rotation, conductors extending from said electrode toward one side only thereof, certain of the conductors being connected to each disc of the electrode, said conductors being exposed for external cooling and welding-current supply means spaced a substantial distance from the electrode, cooperating with said conductors and connected thereby directly to the discs.

18. A welder comprising a frame, a carriage adjustable vertically thereon, shaft supports in said carriage, a shaft journaled in said supports, and a welding electrode on said shaft, one of said supports being movable axially of the shaft whereby to free an end thereof, and means for moving the support toward the end of the shaft.

19. The apparatus defined by claim 18 characterized by a bracket on said frame for suspending said movable support.

20. The apparatus defined by claim 18 characterized by a bracket depending from said frame and engaging said movable bearing, and horizontal guides on said frame movably supporting said bracket.

21. In a welder, the combination with a rotating electrode and conductors extending axially thereof toward one side, of a slip ring assembly having a plurality of conductors disposed circumferentially about a common axis, and connections between the last-mentioned conductors and the first-mentioned conductors, said assembly also including rings concentric with said common axis and spaced therealong having engagement with certain of said second-mentioned conductors.

22. The apparatus defined by claim 21 characterized by said second-mentioned conductors having electrical connection with alternate rings and being insulated from the other rings.

23. The apparatus defined by claim 21 characterized by said second-mentioned conductors being alternately connected to and insulated from each of said rings, passing circumferentially thereof.

24. The combination with a rotary welding electrode, of a slip ring assembly comprising conductors disposed in spaced relation as elements of a cylinder, connections extending from said conductors to said electrode, slip rings mounted on said conductors, and means supporting said conductors and rings for rotation.

25. The combination with a rotary welding electrode, and a current supply means for said welding electrode, of electric conducting members rotatable with the electrode extending between said current supply means and welding electrode and axially of the latter, one end of said members being connected to said current supply means and the other end being connected to the welding electrode, the electrode and supply means being spaced apart horizontally by a distance greater than one-half the diameter of the welding electrode.

26. In a welder, the combination with a current supply means mounted on a shaft rotatably supported in a frame, an electrode at a distance from the current supply means laterally thereof and supported on another shaft substantially coaxial with the first-mentioned shaft, of means providing electric-conducting engagement between the current supply means and the electrode, and means for driving at least one of the shafts.

27. A welder comprising a frame, a carriage adjustable vertically thereon, bearings in said carriage, a shaft journaled in said bearings and a welding electrode on said shaft, a second shaft having current supply means thereon for the welding electrode and rotatable with said electrode, and connections extending along said shafts between said source and said electrode.

28. The apparatus defined by claim 27 characterized by the electrode being spaced from the current supply means by a distance greater than the length of said first-mentioned shaft to facilitate access to said electrode.

29. In a welder, a frame, a bearing carriage slidable vertically on the frame, a bearing bracket movable laterally in the frame, a shaft journaled in said carriage and bracket, an electrode on the shaft, and supply conductors extending through said carriage to the electrode.

JAMES V. CAPUTO.